United States Patent
Mayer

(10) Patent No.: US 9,821,776 B2
(45) Date of Patent: Nov. 21, 2017

(54) BRAKE ACTUATION SENSOR DEVICE FOR A VEHICLE BRAKE SYSTEM AND METHOD FOR MOUNTING A BRAKE ACTUATION SENSOR DEVICE ON A VEHICLE BRAKE SYSTEM

(71) Applicant: Robert Bosch GmbH, Stuttgart (DE)

(72) Inventor: Jochen Mayer, Giengen An der Brenz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 379 days.

(21) Appl. No.: 14/390,722

(22) PCT Filed: Feb. 8, 2013

(86) PCT No.: PCT/EP2013/052505
§ 371 (c)(1),
(2) Date: Oct. 3, 2014

(87) PCT Pub. No.: WO2013/149744
PCT Pub. Date: Oct. 10, 2013

(65) Prior Publication Data
US 2015/0090021 A1    Apr. 2, 2015

(30) Foreign Application Priority Data
Apr. 3, 2012  (DE) .................. 10 2012 205 432

(51) Int. Cl.
*G01M 17/00* (2006.01)
*B60T 7/04* (2006.01)
(Continued)

(52) U.S. Cl.
CPC ............ *B60T 7/042* (2013.01); *B60T 13/567* (2013.01); *B60T 13/745* (2013.01); *B60T 17/22* (2013.01);
(Continued)

(58) Field of Classification Search
USPC ..................................................... 73/121, 129
See application file for complete search history.

(56) References Cited

U.S. PATENT DOCUMENTS 5,261,312 A * 11/1993 Bornemann .......... B60T 8/4059
29/889.5
6,253,656 B1 * 7/2001 Gilles ................... B60T 8/3275
91/367
(Continued)

FOREIGN PATENT DOCUMENTS

CN  101284512 A  10/2008
DE  19741366     4/1999
(Continued)

OTHER PUBLICATIONS

International Search Report for PCT/EP2013/052505, dated Sep. 6, 2013.

*Primary Examiner* — Eric S McCall
(74) *Attorney, Agent, or Firm* — Norton Rose Fulbright US LLP; Gerard Messina

(57) ABSTRACT

A brake actuation sensor device is described for a brake system of a vehicle having a strain and/or compression gage which is reversibly variable in its extension, whereby at least one electrical property is able to be changed, and an evaluation device, by which at least one electrical variable is able to be ascertained with respect to the changeable electrical property, and, taking into account the at least one ascertained electrical variable, an evaluation variable is able to be determined with respect to a brake actuating force, the strain and/or compression gage being additionally developed so that the strain and/or compression gage is able to be situated in direct or indirect contact with a brake booster housing device in such a way that a force exerted on the brake booster housing device causes a mechanical stress in the strain and/or compression gage. Furthermore, a method is
(Continued)

described for mounting a brake actuation sensor device of a brake system of a vehicle.

14 Claims, 4 Drawing Sheets

(51) Int. Cl.
    *B60T 13/567* (2006.01)
    *B60T 13/74* (2006.01)
    *B60T 17/22* (2006.01)
    *G01L 1/04* (2006.01)
    *G01L 1/22* (2006.01)

(52) U.S. Cl.
    CPC .............. *G01L 1/04* (2013.01); *G01L 1/2287* (2013.01); *Y10T 29/49826* (2015.01); *Y10T 29/49947* (2015.01)

(56) References Cited

U.S. PATENT DOCUMENTS

| | | | | |
|---|---|---|---|---|
| 6,729,450 | B1 * | 5/2004 | Albert | B60T 8/3265 188/359 |
| 2003/0213239 | A1 * | 11/2003 | Borsch | B60T 13/52 60/545 |
| 2004/0079222 | A1 * | 4/2004 | Hoffmann | B60T 13/57 91/1 |
| 2004/0162652 | A1 * | 8/2004 | Kems | B60T 13/52 701/30.7 |
| 2008/0134874 | A1 * | 6/2008 | Nen | B60T 13/52 91/367 |
| 2011/0074209 | A1 * | 3/2011 | Ueno | B60T 13/745 303/20 |
| 2011/0146395 | A1 * | 6/2011 | Vollert | B60T 7/042 73/132 |
| 2011/0178687 | A1 * | 7/2011 | Anderson | B60T 13/745 701/70 |
| 2012/0192556 | A1 * | 8/2012 | Verhagen | B60T 8/38 60/585 |
| 2013/0024083 | A1 * | 1/2013 | Jung | B60T 7/042 701/78 |
| 2013/0096795 | A1 * | 4/2013 | Sim | B60T 13/745 701/70 |

FOREIGN PATENT DOCUMENTS

| | | |
|---|---|---|
| EP | 0616932 | 9/1994 |
| EP | 1980459 | 10/2008 |
| JP | S5748626 A | 3/1982 |
| WO | WO2011/110672 | 9/2011 |

\* cited by examiner

US 9,821,776 B2

1

BRAKE ACTUATION SENSOR DEVICE FOR A VEHICLE BRAKE SYSTEM AND METHOD FOR MOUNTING A BRAKE ACTUATION SENSOR DEVICE ON A VEHICLE BRAKE SYSTEM

FIELD OF THE INVENTION

The present invention relates to a brake actuation sensor device for a vehicle brake system. The present invention also relates to a brake booster housing device, a brake booster, an intermediate piece for fastening a brake booster housing device to a vehicle wall component, a fastening component and a brake system for a vehicle. Furthermore, the invention relates to a method for mounting a brake actuation sensor device of a brake system of a vehicle.

BACKGROUND INFORMATION

German Patent No. 197 41 366 describes a brake pedal device which has a brake pedal that is able to be adjusted using a driver brake force, which is able to be situated in a manner that is adjustable via a spring, on a vehicle wall component. A push rod is able to be linked to the brake pedal, via a swivel joint developed on the brake pedal, in such a way that the push rod is also adjustable with respect to the vehicle wall component by the driver brake force exerted on the brake pedal. The pedal force exerted on the brake pedal is to be detected by a force sensor which is developed as a strain gage, for example. For this purpose, the force sensor is situated on the brake pedal itself or on the push road.

SUMMARY

The present invention creates a brake actuation sensor device, a brake booster housing device, a brake booster, an intermediate piece for fastening a brake booster housing device to a vehicle wall component, a fastening component, a brake system for a vehicle, and a method for mounting a brake actuation sensor device on a vehicle brake system.

The present invention enables situating the strain and/or compression gage in which the strain and/or compression gage carries out hardly any/no relative motion with respect to an (adjacent) vehicle wall component, while still ensuring that the mechanical stress is transmitted onto it during the operation of the brake actuating element. Consequently, the present invention eliminates the necessity of designing the strain gage and/or the compression gage and/or an electrical contacting of the strain and/or compression gage to a vehicle on-board electronics system for the usual relative motion of the strain and/or compression gage during the operation of the brake actuating element. The strain and/or compression gage, the electrical contacting of the strain and/or compression gage and/or an evaluation device/electronics cooperating with it, if necessary, are therefore able to be designed more cost-effectively. In addition, because of the omission of the relative motion, a better robustness of the strain and/or compression gage and a lower risk of damage to the strain and/or compression gage is able to be achieved during a brake actuation. The advantageous arrangement of the strain and/or compression gage also leads to its longer service life and/or applicability.

The advantageous arrangement of the strain and/or compression gage also simplifies its assembly to a vehicle brake system. At the same time, it is ensured, because of the positioning of the strain and/or compression gage at a

2 distance from the brake operating element, such as a brake pedal, that the gage is not inadvertently damaged during the operation of the brake operating element by the pressure exerted on it by the driver.

For instance, the strain and/or compression gage is able to include at least one strain gage. Thus the strain and/or compression gage is able to be developed cost-effectively.

In one advantageous specific embodiment, the strain and/or compression gage is at least partially situated, or able to be situated directly on, and/or in the brake booster housing device. In the same way, the strain and/or compression gage may be situated, or be able to be situated, at least partially directly on, and/or in an intermediate piece, which is insertible between the brake booster housing device and a vehicle wall component, on which the brake booster housing device is able to be fastened using at least one fastening component. As an alternative or as a supplement to this, the strain and/or compression gage may be able to be situated at least partially directly on, and/or in a fastening component, using which the brake booster housing device is fastened on the vehicle wall component. All the situation possibilities described at this point for the strain and/or compression gage ensure the advantages described above.

In particular, the strain and/or compression gage may be situated at least partially directly on, and/or in an intelligent screw as the fastening component. Consequently, a cost-effective component is able to be used for implementing the present invention.

The advantages described above of the present invention are also able to be effected using the brake booster housing device of the brake booster, the intermediate piece for fastening a brake booster housing device to a vehicle wall component, the fastening component, the brake system for a vehicle and using a method of mounting a brake actuation sensor device on a brake system of a vehicle.

DETAILED DESCRIPTION

Figure 1A:
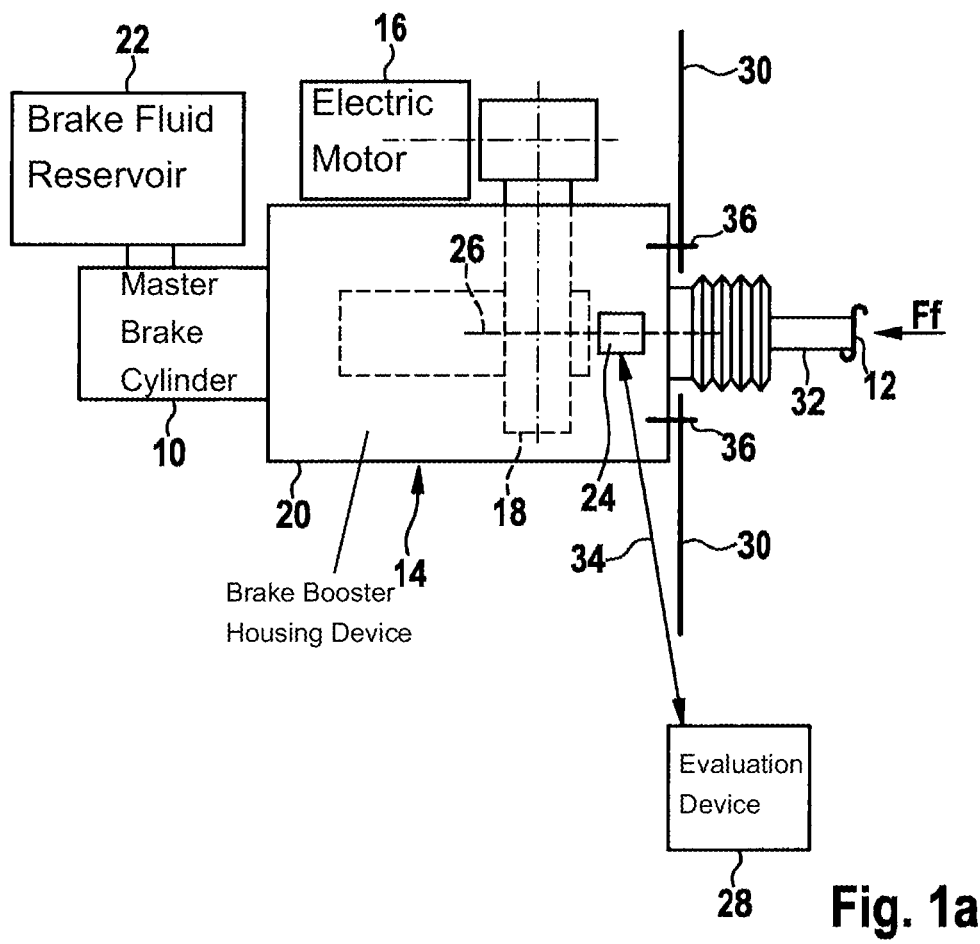
FIGS. 1a and 1b show a schematic partial representation of a first brake system and a coordinate system for explaining a first specific embodiment of the brake actuation sensor device.
Figure 1B:
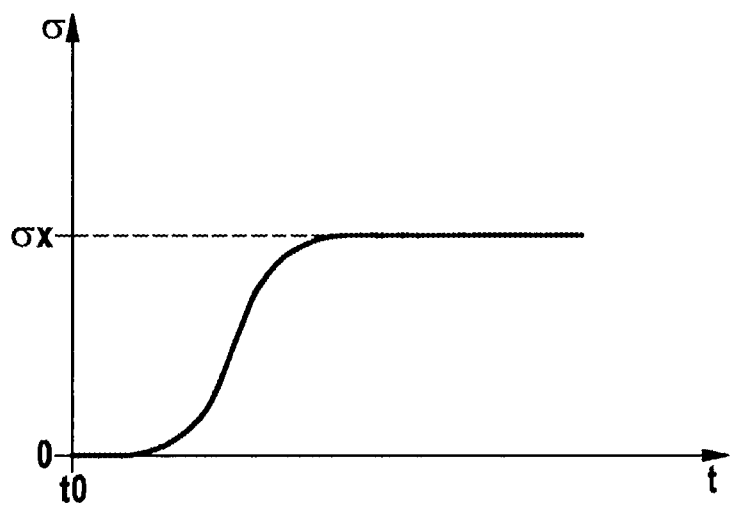

FIGS. 1a and 1b show a schematic partial representation of a first brake system and a coordinate system for explaining a first specific embodiment of the brake actuation sensor device.

The first brake system reproduced partially schematically in FIG. 1a, also has a brake booster 14 in addition to a master brake cylinder 10 and a brake operating element 12. Using brake booster 14, in addition to driver brake force Ff applied to brake operating element 12, another booster force (not shown) may be exerted, during an operation of brake operating element 12 by the driver, on at least one adjustable piston of master brake cylinder 10. In this way, the driver may be supported, as far as force is concerned, during the braking of his vehicle. The brake booster 14 shown in FIG. 1a is developed as an electromechanical brake booster 14 having an electric motor 16 and a brake booster transmission 18. It is pointed out, however, that the applicability of the brake actuation sensor device, described further on, is not limited to the equipment of a brake system with an electromechanical brake booster 14. In place of brake booster transmission 18, a different subunit of a brake booster 14 may, at least partially, be situated in a brake booster housing device 20. The development of brake booster 14 as an electromechanical brake booster 14 should only be interpreted in exemplary fashion. Similarly, the first brake system, instead of a brake operating element 12, developed as a brake pedal, may also have a different operating element type. Furthermore, the linking of master brake cylinder 10 to a brake fluid reservoir 22 is only optional.

The first brake system is equipped with a brake actuation sensor device, which has a strain and/or compression gage 24. The strain and/or compression gage 24 is developed so that strain and/or compression gage 24 is reversibly variable in its extension along at least one specified spatial direction 26, whereby at least one electrical property of strain and/or compression gage 24 is changeable. The electrical property that is changeable using the varying of strain and/or compression gage 24 along the at least one specified spatial direction 26 may, for instance, be a voltage, a resistance and/or a current flow. Strain and/or compression gage 24 may be designed, for example, for the utilization of the piezoelectric effect or for utilization of the piezoresistive effect. In particular, strain and/or compression gage 24 may be developed as a piezoelectric sensor element and/or a piezoresistive sensor element. Strain and/or compression gage 24 is not limited to such a development, however.

In one advantageous specific embodiment, strain and/or compression gage 24 includes at least one strain gage. It is pointed out that a large number of known development examples of strain gages are able to be used for strain and/or compression gage 24. Strain and/or compression gage 24 is thus able to be produced cost-effectively. It is also pointed out that the ability to develop strain and/or compression gage 24 is not limited to the use of a strain gage.

The brake actuation sensor device also includes an evaluation device 28, by which at least one electrical variable may be ascertained with respect to the electrical property that is changeable by a variation of the extension of strain and/or compression gage 24 along the at least one specified spatial direction 26. In addition, using evaluation device 28, while taking into account the at least one ascertained electrical variable, one is able to determine an evaluation variable with respect to a brake actuating force exerted on brake operating element 12 of the first brake system. For example, driver brake force Ff and/or a braking pressure is able to be determined as evaluation variable using evaluation device 28. However, the practicability of evaluation device 28 is not limited to the determining of the variables enumerated here as the evaluation variable.

Moreover, strain and/or compression gage 24 is additionally developed in such a way that strain and/or compression gage 24 is able to be situated/is situated in direct or indirect contact with a brake booster housing device 20 that a force exerted on brake booster housing device 20 has the effect of a mechanical stress in strain and/or compression gage 24. For instance, strain and/or compression gage 24 is able to be situated/is situated in (direct) contact with brake booster housing device 20 in such a way that a compressive force/traction force exerted on brake booster housing device 20 (during an operation of the brake operating element 12) is able to be transmitted at least partially to strain and/or compression gage 24. Consequently, a mechanical stress exerted during the operation of brake operating element 12 on brake booster housing device 20 is at least partially transmitted to strain and/or compression gage 24, and has the effect of varying the extension of strain and/or compression gage 24 along the at least one specified spatial direction 26. In the same way, strain and/or compression gage 24 is able to be situated/is situated via at least one intermediate component in an (indirect) contact with brake booster housing device 20 in such a way that the compressive force/traction force exerted on brake booster housing device 20 causes a compressive force/traction force in the at least one intermediate component, which is subsequently transmitted as a mechanical stress/compressive stress/traction stress to strain and/or compression gage 24. In this way too, a demonstrable varying of the extension of strain and/or compression gage 24 is able to be triggered. The at least one electrical property of strain and/or compression gage 24 is changed thereby, which is detectable by using evaluation device 28 during an operation of the brake actuation sensor device.

It should be pointed out that situating strain and/or compression gage 24 in a direct or indirect contact with brake booster housing device 20 should preferably be interpreted in such a way that the mechanical stress in strain and/or compression gage 24 does not only occur simultaneously with the force exerted on brake booster housing device 20, but using the force exerted on brake booster housing device 20, the mechanical stress in strain and/or compression gage 24 is able to be induced/triggered.

Evaluation device 28 is able to output as output variable information as to whether driver brake force Ff/a brake actuating force unequal to zero is being exerted on brake operating element 12. Furthermore, in addition to this information, evaluation device 28 is also able to determine a brake actuating force variable, such as driver brake force Ff, a brake operating path and/or a brake pressure, with high accuracy and a low probability of error as the evaluation variable.

The brake actuation sensor device described in the above paragraphs has the advantage that strain and/or compression gage 24 during operation is situated in such a way that strain and/or compression gage 24, during operation of brake operating element 12 by the driver carries out (almost) no relative motion, for instance, with reference to a vehicle wall component 30, on which brake booster housing device 20 is mounted/fastened. By contrast to a measuring element situated on a brake operating element 12 or a push rod 32, strain and/or compression gage 24 thus does not change/hardly changes its attitude/position during the operation of brake operating element 12. Consequently, the necessity drops out of designing the strain and/or compression gage 24 and/or an electrical link 34 between strain and/or compression gage 24 to an evaluation device 28 for the usual relative motion of strain and/or compression gage 24 during the operation of brake actuating element 12. The brake actuation sensor device may thus have the technical feature that electrical link 34 is developed for an exclusively static utilization of strain and/or compression gage 24. Electric link 34 developed, for example, as connecting line of strain and/or compression gage 24 to evaluation device 28 is thus preferably not designed for compensating for the usual relative motion.

The brake actuation sensor device has lower susceptibility to errors, because of the advantageous development/situation of strain and/or compression gage 24. A longer service life and/or a lower failure rate of the advantageous strain and/or compression gage 24 is ensured because of the advantageous development/situation of strain and/or compression gage 24. In addition, electrical link 34 is able to be developed comparatively cost-effectively.

It should be pointed out that the applicability of evaluation device 28 is possible independently of the situation of evaluation device 28. Thus, evaluation device 28 may be situated non-detachably. In particular, evaluation device 28 is able to be integrated into a central control electronics system of the brake system and/or the vehicle equipped with the brake system.

In the first brake system partially reproduced schematically in FIG. 1a, strain and/or compression gage 24 is situated (at least partially) directly on, and/or in brake booster housing device 20. In a preferred manner, the position of strain and/or compression gage 24 is situated on, and/or in a region of brake booster housing device 20 which, in response to an operation of brake operating element 12, experiences a mechanical stress brought about by driver brake force Ff. In addition, a position of the respective region is preferred which is upstream of the initiation of the booster force/servo force of motor 16 of brake booster 14. Consequently, it may be avoided that the booster force/servo force leads to additional mechanical stresses within strain and/or compression gage 24, which might possibly impair the evaluation variable that is able to be determined using evaluation device 28. One may also circumscribe the preferred position of strain and/or compression gage 24 on, and/or in brake booster housing device 20, so that strain and/or compression gage 24 is developed on, and/or in a subregion of brake booster housing device 20, which lies in a space between a transmission axis of brake booster 14 and brake operating element 12.

FIG. 1a also shows a brake booster housing device 20 having a strain and/or compression gage 24, which is developed in such a way that the strain and/or compression gage 24 is reversibly variable in its extension along at least one specified spatial direction 26, whereby at least one electrical property of strain and/or compression gage 24 is changeable, and which is situated directly on, and/or in brake booster housing device 20. A brake booster equipped with the advantageous brake booster housing device 20 is also reproduced in FIG. 1a.

FIG. 1b shows a coordinate system to explain the functioning manner of strain and/or compression gage 24 described above. The abscissa of the coordinate system is time axis t. The ordinate of the coordinate system of FIG. 1b indicates a tensile stress σ transmitted by brake booster housing device 20 to strain and/or compression gage 24 as the mechanical stress.

Before a beginning of a brake actuation at time t0, no traction force is exerted on strain and/or compression gage 24. Therefore, before time t0, (almost) no tensile stress occurs in strain and/or compression gage 24.

As of time t0, the driver operates brake operating element 12. Because of the fastening of brake booster housing device 20 using at least one fastening component 36 on a vehicle wall component 30, such as a vehicle splash wall, it is reliably ensured that brake booster housing device 20 remains in its desired attitude/position in spite of driver brake force Ff. However, driver brake force Ff unequal to zero, exerted on brake operating element 12, gives rise to a tensile stress/traction force as the mechanical stress in brake booster housing device 20, which is at least partially able to be transmitted to strain and/or compression gage 24.

Consequently, in strain and/or compression gage 24, as of time t0, a tensile stress σ appears, having a value of σx that is unequal to zero. This tensile stress σx unequal to zero may be interpreted as the driver's braking command. Depending on the intensity and alignment of the occurring tensile stress σ, it is able not only to be detected whether the driver is braking, but also with what intensity/driver brake force Ff the actuation of brake operating element 12 is being executed.

Figure 2A:
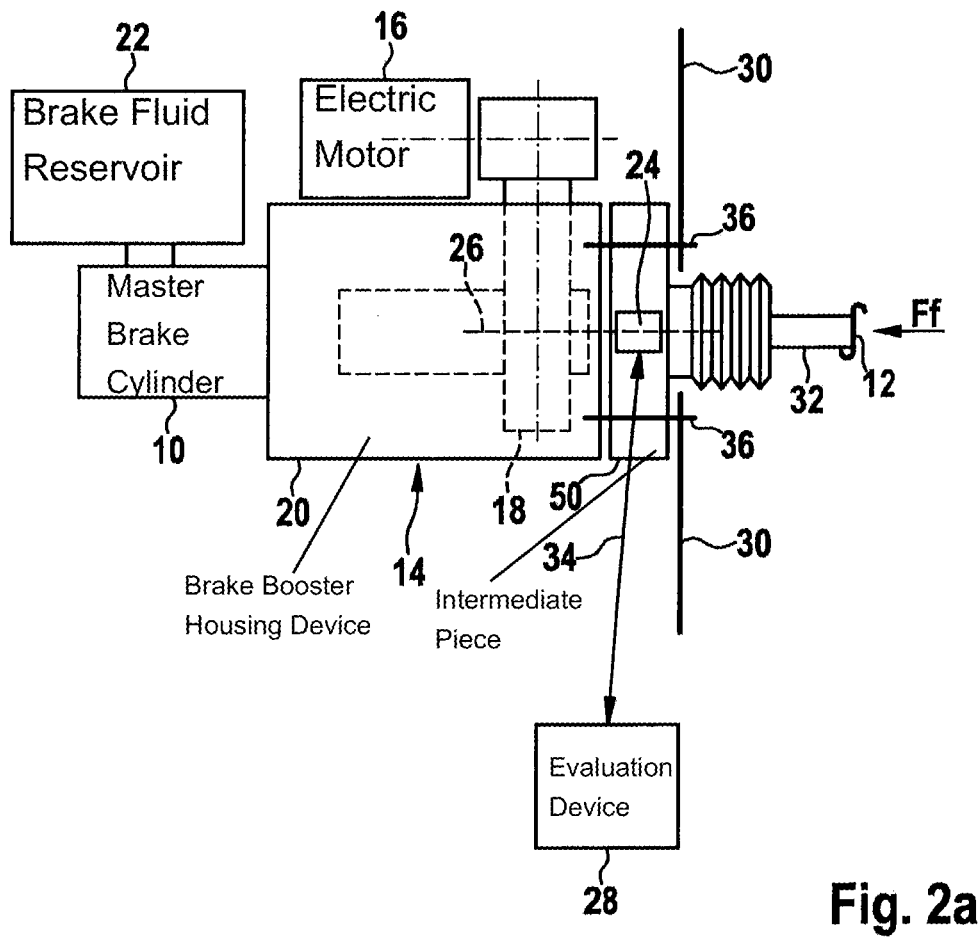
FIGS. 2a and 2b show a schematic partial representation of a second brake system and a coordinate system for explaining a second specific embodiment of the brake actuation sensor device.
Figure 2B:
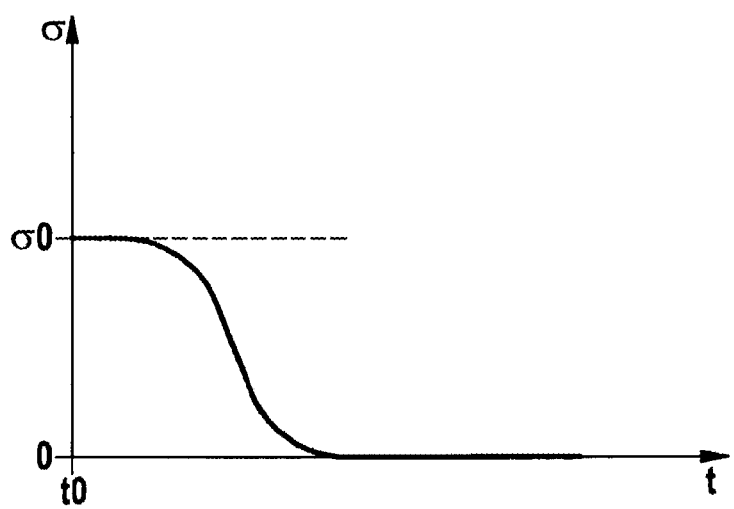

FIGS. 2a and 2b show a schematic partial representation of a second brake system and a coordinate system for explaining a second specific embodiment of the brake actuation sensor device.

In the second brake system shown partially schematically in FIG. 2a, strain and/or compression gage 24 is situated/able to be situated (at least partially) directly on, and/or in an intermediate piece 50, which is insertible/is inserted between brake booster housing device 20 and vehicle wall component 30, on which brake booster housing device 20 is able to be fastened/is fastened using at least one fastening component 36. Intermediate piece 50 may be a spacer and/or a separator. Let it be pointed out that the practicability of intermediate piece 50 is not limited to a specific type of intermediate piece.

FIG. 2a also reproduces an intermediate piece 50 for fastening a brake booster housing device 20 to a vehicle wall component 30, such as a vehicle splash wall, having a strain and/or compression gage 24. The strain and/or compression gage 24 is developed so that strain and/or compression gage 24 is reversibly variable in its extension along at least one specified spatial direction 26, whereby at least one electrical property of strain and/or compression gage 24 is changeable. In addition, strain and/or compression gage 24 is situated/able to be situated directly on, and/or in intermediate piece 50 in such a way that intermediate piece 50 is insertible between brake booster housing device 20 and vehicle wall component 30. To fasten brake booster housing device 20 to vehicle wall component 30, for instance, at least one screw may be used as fastening component 36.

The coordinate system of FIG. 2b reproduces the method of functioning of the advantageously situated strain and/or compression gage 24. The abscissa of the coordinate system is time axis t. The ordinate of the coordinate system of FIG. 2b indicates a compressive stress σ occurring in strain and/or compression gage 24 as the mechanical stress.

By prestressing intermediate piece 50 with a corresponding force during the mounting of brake booster 14, a compressive stress is able to be effected in intermediate piece 50. Consequently, even before time t0, as of which the driver actuates brake operating element 12, an initial compressive stress σ0 (unequal to zero) is transmitted/exerted as compressive stress σ (mechanical stress) on strain and/or compression gage 24.

As of time t0, the driver actuates brake operating element 12. The actuation of brake operating element 12 effects a drop in compressive stress σ in strain and/or compression gage 24. Evaluation device 28 is able to detect this drop in compressive stress σ below initial compressive stress σ0 and draw upon it for newly determining the evaluation variable.

Even in the advantageous situation of strain and/or compression gage 24 reproduced in FIG. 2a, a reliable detection of a brake actuation of the driver is thus ensured. It is pointed out that, even in this advantageous situation of strain and/or compression gage 24, (almost) no relative motion of strain and/or compression gage 24 takes place during the actuation of brake operating element 12. The advantages named above are thus also further ensured, even in this advantageous situation of strain and/or compression gage 24.

Figure 3A:
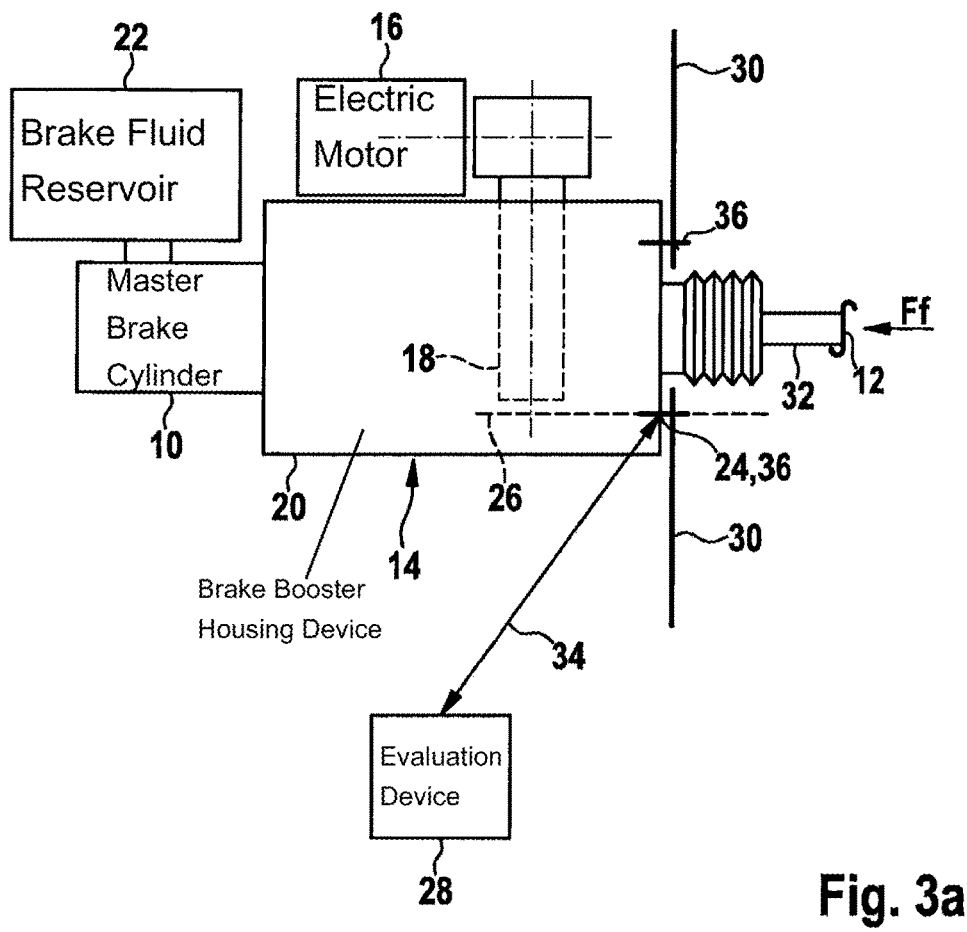
FIGS. 3a and 3b show a schematic partial representation of a third brake system and a coordinate system for explaining a third specific embodiment of the brake actuation sensor device.
Figure 3B:
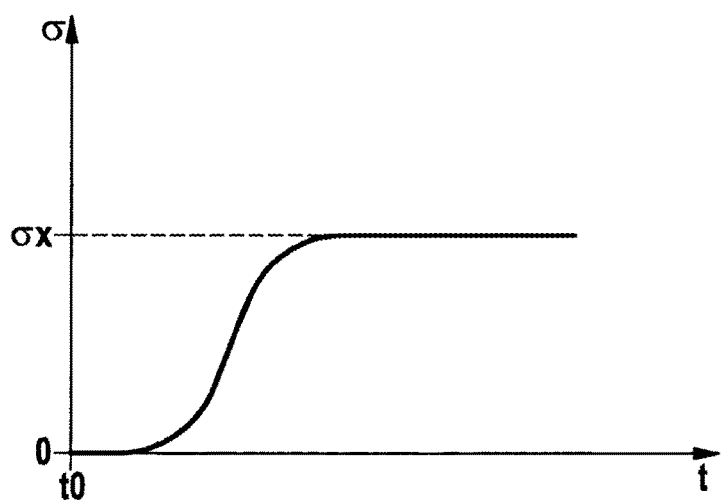

FIGS. 3a and 3b show a schematic partial representation of a third brake system and a coordinate system for explaining a third development form of the brake actuation sensor device.

In the brake actuation sensor device shown schematically in FIG. 3a, strain and/or compression gage 24 is at least partially situated/able to be situated directly on, and/or in at least one fastening component 36, using which, brake booster housing device 20 is able to be fastened on a vehicle wall component 30. The at least one fastening component 36 may be a screw, for example. In particular, strain and/or compression gage 24 may be situated/able to be situated at least partially directly on, and/or in an intelligent screw as the fastening component. In the same way, an intelligent screw may be used as strain and/or compression gage 24. The intelligent screw may be an i-bolt, for example. Thus, a component that is already conventionally produced frequently and cost-effectively may be used as strain and/or compression gage 24.

FIG. 3a also represents a fastening component 36, which has a strain and/or compression gage 24, which is developed in such a way that strain and/or compression gage 24 is reversibly variable in its extension along at least one specified spatial direction 26. Because of this, at least one electrical property of strain and/or compression gage 24 is changeable. The strain and/or compression gage is situated/able to be situated directly on, and/or in fastening component 36 in such a way that, using fastening component 36, a brake booster housing device 20 is able to be fastened on a vehicle wall component 30. In particular, in this case too, fastening component 36, for instance, an intelligent screw, may be used as a strain and/or compression gage 24.

The advantageous method of functioning of strain and/or compression gage 24 situated on, or in the fastening component is reproduced with the aid of the coordinate system of FIG. 3b. For the further explanation of this method of functioning, we refer to FIG. 1b.

The brake systems described in the above paragraphs represent advantageous development possibilities of a brake system according to the technology as in the present invention. However, the practicability of such a brake system is not limited to the components reflected in the brake systems.

Figure 4:
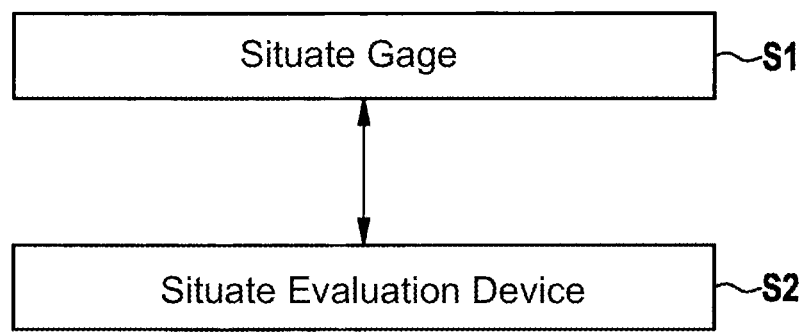
FIG. 4 shows a flow chart for representing a specific embodiment of the method for mounting a brake actuation sensor device on a brake system of a vehicle.

FIG. 4 shows a flow chart for representing a specific embodiment of the method for mounting a brake actuation sensor device on a brake system of a vehicle.

The brake systems described above are able to be developed, for example, using the method described as follows. It should be noted, however, that the feasibility of the method is not limited to the production of the brake system described above.

In a method step S1, (at least one) strain and/or compression gage of the later brake actuation sensor device is situated on the brake system in such a way that the (at least one) strain and/or compression gage is reversibly varied in its extension along at least one specified spatial direction during the actuation of a brake operating element of the brake system, whereby at least one electrical property of the strain and/or compression gage is changed. For this purpose, the strain and/or compression gage is situated in direct or indirect contact with a brake booster housing device of the brake system in such a way that a force exerted on the brake booster housing device gives rise to a mechanical stress in the strain and/or compression gage. The (at least one) strain and/or compression gage is at least partially situated directly on, and/or in the brake booster housing device. Similarly, an intermediate piece may be inserted, having the (at least one) strain and/or compression gage at least partially situated at, and/or on it between the brake booster housing device and a vehicle wall component, on which the brake booster housing device is fastened using at least one fastening component. As an alternative or in supplement to this, the brake booster housing device is able to be fastened to a vehicle wall component, using a fastening component, with the at least partially at it, or on it (at least one) strain and/or compression gage. Combinations of the exemplary embodiments described in this document are also possible.

In a method step S2 carried out before, simultaneously or afterwards, an evaluation device is situated on the vehicle which, during operation of the brake actuation sensor device, ascertains at least one electrical variable with respect to the electrical property changed by a varying of the extension of the strain and/or compression gage along the at least one specified spatial direction, and, while taking into account the at least one ascertained electrical variable, determines an evaluation variable with respect to a brake actuating force exerted on a brake operating element of the brake system.

What is claimed is:

1. A brake actuation sensor device for a brake system of a vehicle, comprising:
   a strain and/or compression gage arranged so that the strain and/or compression gage is reversibly variable in its extension along at least one specified spatial direction, whereby at least one electrical property of the strain and/or compression gage is changeable; and
   an evaluation device, by which at least one electrical variable is ascertainable with respect to an electrical property that is changeable by a variation of the extension of the strain and/or compression gage along the at least one specified spatial direction, wherein:
   by taking into account the at least one ascertained electrical variable, an evaluation variable is able to be determined with respect to a brake actuating force exerted on a brake actuating element of the brake system, and
   the strain and/or compression gage is able to be situated in direct or indirect contact with a brake booster housing device in such a way that a force exerted on the brake booster housing device causes a mechanical stress in the strain and/or compression gage.

2. The brake actuation sensor device as recited in claim 1, wherein the strain and/or compression gage includes at least one strain gage.

3. The brake actuation sensor device as recited in claim 1, wherein the strain and/or compression gage is situated or able to be situated at least one of at least partially directly on, and at least partially directly in the brake booster housing device.

4. The brake actuation sensor device as recited in claim 1, wherein the strain and/or compression gage is situated, or is able to be situated at least one of at least partially directly on, and at least partially directly in an intermediate piece insertible between the brake booster housing device and a vehicle wall component, on which the brake booster housing device is able to be fastened using at least one fastening component.

5. The brake actuation sensor device as recited in claim 1, wherein the strain and/or compression gage is situated in such a way that, during operation of the brake actuating element by the driver, the strain and/or compression gage carries out substantially no motion relative to a vehicle wall component on which the brake booster housing device is mounted.

6. The brake actuation sensor device as recited in claim 1, wherein the strain and/or compression gage is situated or able to be situated at least one of at least partially directly on, and at least partially in a fastening component, using which, the brake booster housing device is able to be fastened on the vehicle wall component.

7. The brake actuation sensor device as recited in claim 6, wherein the strain and/or compression gage is situated at least one of at least partially directly on, and at least partially in an intelligent screw as the fastening component.

8. The brake actuation sensor device as recited in claim 1, wherein the strain and/or compression gage is situated on and/or in a region of the brake booster housing device upstream of a force insertion mechanism of a brake booster of the brake booster housing device.

9. The brake actuation sensor device as recited in claim 8, wherein the region is between a transmission of the brake booster and the brake actuating element.

10. A brake booster, comprising at least one of:
a brake actuation sensor device for a brake system of a vehicle and including:
a strain and/or compression gage arranged so that the strain and/or compression gage is reversibly variable in its extension along at least one specified spatial direction, whereby at least one electrical property of the strain and/or compression gage is changeable; and
an evaluation device, by which at least one electrical variable is ascertainable with respect to an electrical property that is changeable by a variation of the extension of the strain and/or compression gage along the at least one specified spatial direction, wherein:
by taking into account the at least one ascertained electrical variable, an evaluation variable is able to be determined with respect to a brake actuating force exerted on a brake actuating element of the brake system, and
the strain and/or compression gage is situated in direct or indirect contact with a brake booster housing device in such a way that a force exerted on the brake booster housing device causes a mechanical stress in the strain and/or compression gage; and
the brake booster housing device, including the strain and/or compression gage arranged so that the strain and/or compression gage is reversibly variable in its extension along the at least one specified spatial direction, whereby at least one electrical property of the strain and/or compression gage is able to be changed, and which is situated at least one of: directly on the brake booster housing device, or and in the brake booster housing device.

11. A method for mounting a brake actuation sensor device on a brake system of a vehicle, comprising:
situating a strain and/or compression gage of the brake actuation sensor device on the brake system in such a way that the strain and/or compression gage is reversibly varied in its extension along at least one specified spatial direction during an operation of a brake operating element of the brake system, whereby at least one electrical property of the strain and/or compression gage is changed; and
situating an evaluation device on the vehicle, which, during operation of the brake actuation sensor device, ascertains at least one electrical variable with respect to an electrical property that is changed by a variation of the extension of the strain and/or compression gage along the at least one specified spatial direction and, by taking into account the at least one ascertained electrical variable, determines an evaluation variable with respect to a brake actuating force exerted on a brake actuating element of the brake system, wherein the strain and/or compression gage is situated in direct or indirect contact with a brake booster housing device of the brake system in such a way that a force exerted on the brake booster housing device causes a mechanical stress in the strain and/or compression gage.

12. The method as recited in claim 11, wherein the strain and/or compression gage is situated at least one of at least partially directly on, and in the brake booster housing device.

13. The method as recited in claim 11, wherein an intermediate piece, having the strain and/or compression gage at least one of at least partially situated at, and on the intermediate piece, is inserted between the brake booster housing device and a vehicle wall component, on which the brake booster housing device is fastened using at least one fastening component.

14. The method as recited in claim 11, wherein the brake booster housing device is fastened to a vehicle wall component, using a fastening component, having the strain and/or compression gage that is at least one of at least partially situated at, and on the fastening component.

* * * * *